US008086071B2

(12) United States Patent
Chen et al.

(10) Patent No.: US 8,086,071 B2
(45) Date of Patent: Dec. 27, 2011

(54) SYSTEM AND METHOD FOR REVEALING OCCLUDED OBJECTS IN AN IMAGE DATASET

(75) Inventors: Xin Chen, Evanston, IL (US); William Gale, Oak Park, IL (US)

(73) Assignee: NAVTEQ North America, LLC, Chicago, IL (US)

( * ) Notice: Subject to any disclaimer, the term of this patent is extended or adjusted under 35 U.S.C. 154(b) by 1085 days.

(21) Appl. No.: 11/980,033

(22) Filed: Oct. 30, 2007

(65) Prior Publication Data

US 2009/0110239 A1   Apr. 30, 2009

(51) Int. Cl.
  G06K 9/36    (2006.01)
  G06K 9/00    (2006.01)
  G06T 15/40   (2011.01)
  G06G 5/13    (2006.01)

(52) U.S. Cl. ........ 382/284; 382/154; 382/103; 345/629; 345/421

(58) Field of Classification Search ............ 382/284, 382/154, 103; 345/629, 421
See application file for complete search history.

(56) References Cited

U.S. PATENT DOCUMENTS

| | | | | |
|---|---|---|---|---|
| 5,161,886 A | | 11/1992 | De Jong et al. | 364/449 |
| 5,684,887 A | * | 11/1997 | Lee et al. | 382/107 |
| 5,774,569 A | | 6/1998 | Waldenmaier | |
| 5,953,076 A | * | 9/1999 | Astle et al. | 348/584 |
| 6,222,583 B1 | | 4/2001 | Matsumura et al. | |
| 6,360,168 B1 | * | 3/2002 | Shimabara | 701/211 |
| 6,363,161 B2 | | 3/2002 | Laumeyer et al. | |
| 6,760,026 B2 | * | 7/2004 | Li et al. | 345/427 |
| 6,760,488 B1 | * | 7/2004 | Moura et al. | 382/285 |
| 6,956,573 B1 | * | 10/2005 | Bergen et al. | 345/473 |
| 7,155,336 B2 | | 12/2006 | Dorfman et al. | 701/200 |
| 7,216,035 B2 | | 5/2007 | Hortner et al. | 701/211 |
| 7,688,229 B2 | | 3/2010 | Sula et al. | |
| 2002/0113791 A1 | * | 8/2002 | Li et al. | 345/427 |
| 2004/0090523 A1 | * | 5/2004 | Kondo et al. | 348/46 |
| 2004/0098175 A1 | | 5/2004 | Said et al. | 701/1 |
| 2004/0126014 A1 | * | 7/2004 | Lipton et al. | 382/173 |
| 2004/0151342 A1 | * | 8/2004 | Venetianer et al. | 382/103 |
| 2005/0104878 A1 | * | 5/2005 | Kaye et al. | 345/419 |
| 2006/0120592 A1 | * | 6/2006 | Park et al. | 382/154 |
| 2007/0118281 A1 | | 5/2007 | Adam et al. | |
| 2008/0112610 A1 | * | 5/2008 | Israelsen et al. | 382/154 |
| 2008/0246759 A1 | * | 10/2008 | Summers | 345/420 |

OTHER PUBLICATIONS

"Automatic Occlusion Removal from Minimum Number of Images," HERLEY, Image Processing, 2005; vol. 2, Issue, Sep. 11-14, 2005; 4 pages.*

* cited by examiner

Primary Examiner — Wengpeng Chen
(74) Attorney, Agent, or Firm — Frank J. Kozak; Jon D. Shutter; Adil M. Musabji

(57) ABSTRACT

Disclosed are a system and method for identifying objects in an image dataset that occlude other objects and for transforming the image dataset to reveal the occluded objects. In some cases, occluding objects are identified by processing the image dataset to determine the relative positions of visual objects. Occluded objects are then revealed by removing the occluding objects from the image dataset or by otherwise de-emphasizing the occluding objects so that the occluded objects are seen behind it. A visual object may be removed simply because it occludes another object, because of privacy concerns, or because it is transient. When an object is removed or de-emphasized, the objects that were behind it may need to be "cleaned up" so that they show up well. To do this, information from multiple images can be processed using interpolation techniques. The image dataset can be further transformed by adding objects to the images.

25 Claims, 8 Drawing Sheets

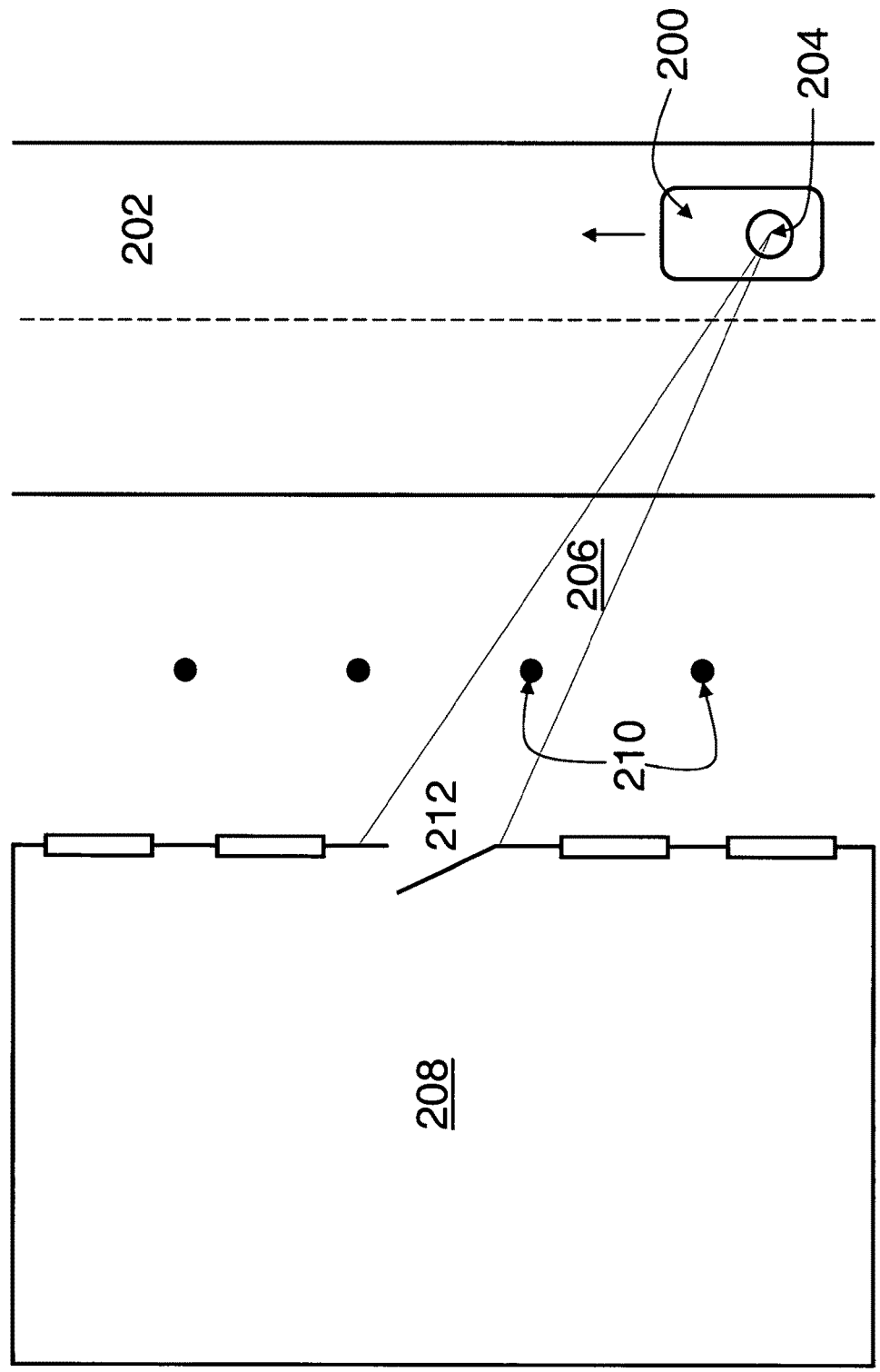

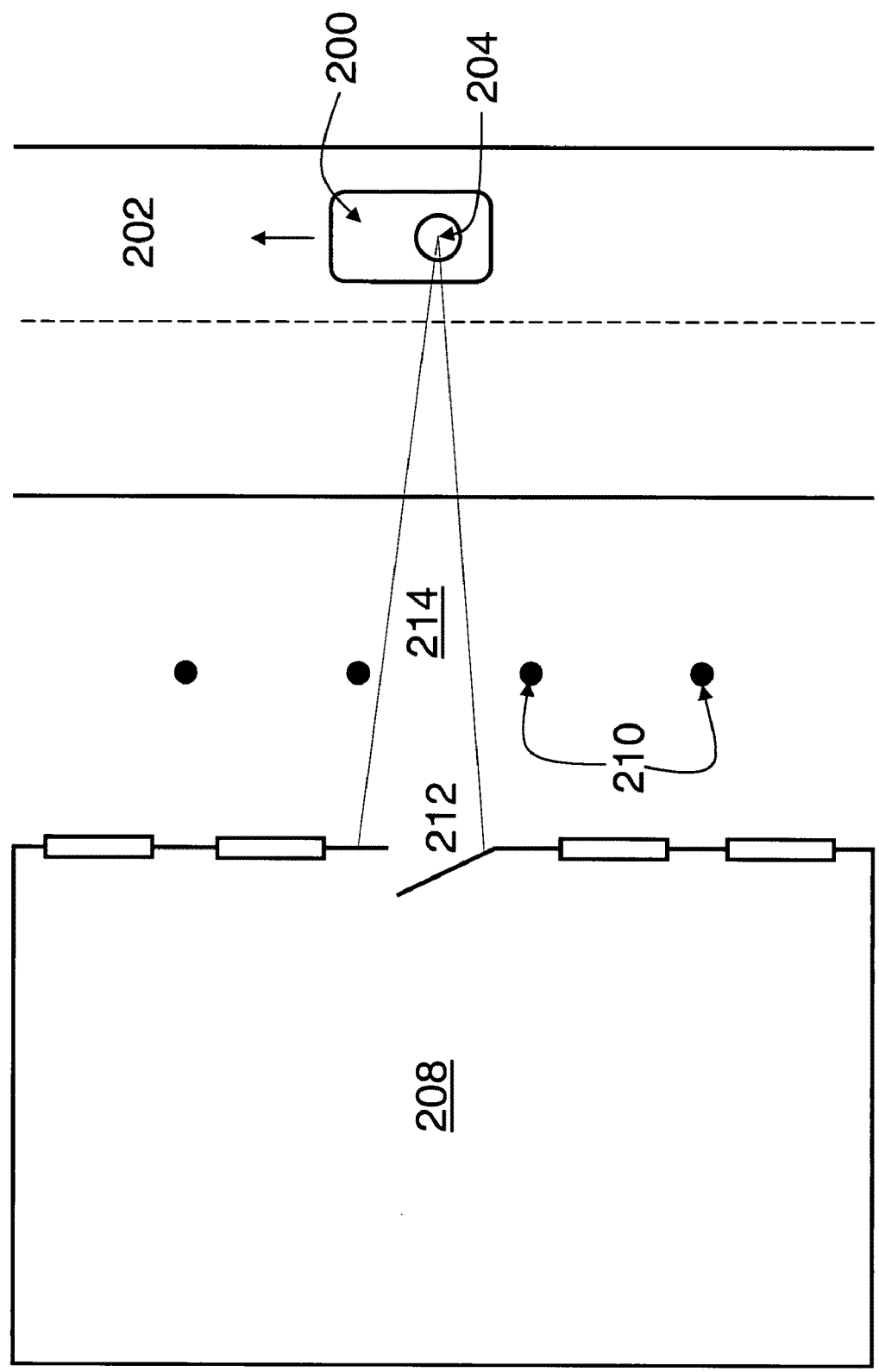

FIG. 4

400: Determine the relative positions of objects in the image dataset (i.e., which objects sit in front of which other objects).

402: Apply various techniques to determine which objects, if any, to remove or to otherwise de-emphasize.

404: Effectively remove or de-emphasize the chosen objects from the image dataset.

406: As necessary, "clean up" the objects that are revealed behind the now removed or de-emphasized objects.

408: As desired, add new virtual objects to the image dataset.

SYSTEM AND METHOD FOR REVEALING OCCLUDED OBJECTS IN AN IMAGE DATASET

FIELD OF THE INVENTION

The present invention is related generally to collections of images, and, more particularly, to processing images to reveal occluded objects.

BACKGROUND OF THE INVENTION

Image-based navigation has become popular. In one type of system, a computer displays to a user photographic images taken in a real-world locality. The user navigates through a representation of the depicted locality by changing his virtual location or by "turning his head." The computer keeps up with the user's navigation and displays photographic images taken from the real-world locality that represent the user's current point of view. Thus, the user is given a virtual, visual tour of the real-world locality. One system for performing this kind of feature is disclosed in U.S. Pat. No. 7,688,229, filed Apr. 30, 2007, the entire disclosure of which is incorporated by reference herein.

An image dataset often lies behind the navigation application. The images used for this application are collected by a set of one or more cameras carried through the locality. The camera may be mounted on a vehicle or carried by a person on foot. The cameras take pictures (or video) in all directions as the vehicle or person moves. Because numerous, overlapping pictures are taken from several points of view, the set of pictures can be post-processed to create seamless 360-degree images, as disclosed in U.S. Pat. No. 7,688,229. These images are correlated with real-world geography, for example by gathering GPS data at the same time as the pictures are taken.

Because the pictures are taken from public streets, they often include people, vehicles, and other transient objects that would be of no use to a user navigating through the virtual representation of the depicted locality. Furthermore, objects (e.g., trees) may obscure other objects (e.g., buildings). The presence of people in the pictures also raises privacy concerns when the people can be identified.

BRIEF SUMMARY OF THE INVENTION

The above considerations, and others, are addressed by the present invention, which can be understood by referring to the specification, drawings, and claims. According to aspects of the present invention, objects in an image dataset that visually block (or "occlude") other objects are identified, and then the image dataset is transformed to reveal the occluded objects.

Various embodiments employ several techniques, separately or together, to identify which objects occlude other objects. In some cases, occluding objects are identified by processing the image dataset to determine the relative positions of visual objects. In a first example, the images include precise location information (possibly gathered by a LIDAR system when the pictures were taken). Objects that sit in front of, say, a background wall are identified by their location as possible occluding objects. In another example, different pictures taken from slightly different viewpoints are compared. A possibly occluding foreground object can be seen to "move" by parallax with respect to a background object.

Depending upon various circumstances, occluded objects can be revealed by removing the occluding objects from the image dataset. In other circumstances, an occluding object is left in place but is visually "de-emphasized" (e.g., it is rendered semi-transparent) to allow the occluded object to be seen. A visual object may be removed simply because it occludes another object (e.g., a tree that blocks a store sign). Another object may be removed because of privacy concerns (e.g., face-detection software identifies that an object is a person). A third object may be removed because it is transient (e.g., by comparing images, it is clear that the object was moving while the pictures were taken).

When an object is removed or de-emphasized, the visual objects that were behind it may need to be "cleaned up" so that they show up well. Multiple, overlapping images are useful here. For example, a doorway may be obscured by a tree directly in front of it, but the doorway may be seen from an angle in pictures taken before or after passing the tree. Information from these images taken at an angle can be processed using known interpolation techniques, such as affine transformations, to reproduce a direct-on image of the doorway. Where no other information is available, the texture of objects surrounding the visual "hole" left by removing or de-emphasizing the occluding object can be interpolated to fill the hole.

In some embodiments, the resulting image dataset is further transformed. In a "virtual landscaping" application, for example, trees and shrubbery objects are added to a view of buildings along an actual street to test whether the effect is desirable. Different locations for signs and other small structures can be tested in this manner both for aesthetic and practical effect.

BRIEF DESCRIPTION OF THE SEVERAL VIEWS OF THE DRAWINGS

While the appended claims set forth the features of the present invention with particularity, the invention, together with its objects and advantages, may be best understood from the following detailed description taken in conjunction with the accompanying drawings of which:

FIG. 2A is an overhead schematic of a vehicle collecting images in a street locality; in this view, a doorway is partially occluded by a signpost;

FIG. 2B is similar to FIG. 2A, but the vehicle has moved down the street to a position where the doorway is not occluded by the signpost;

FIG. 4 is a flowchart of an exemplary method for post-processing an image dataset.

DETAILED DESCRIPTION OF THE INVENTION

Figure 1A:
FIG. 1A is a photograph of a street locality showing a shop sign partially occluded by a street sign.

Turning to the drawings, wherein like reference numerals refer to like elements, the invention is illustrated as being implemented in a suitable environment. The following description is based on embodiments of the invention and should not be taken as limiting the invention with regard to alternative embodiments that are not explicitly described herein.

Figure 1B:
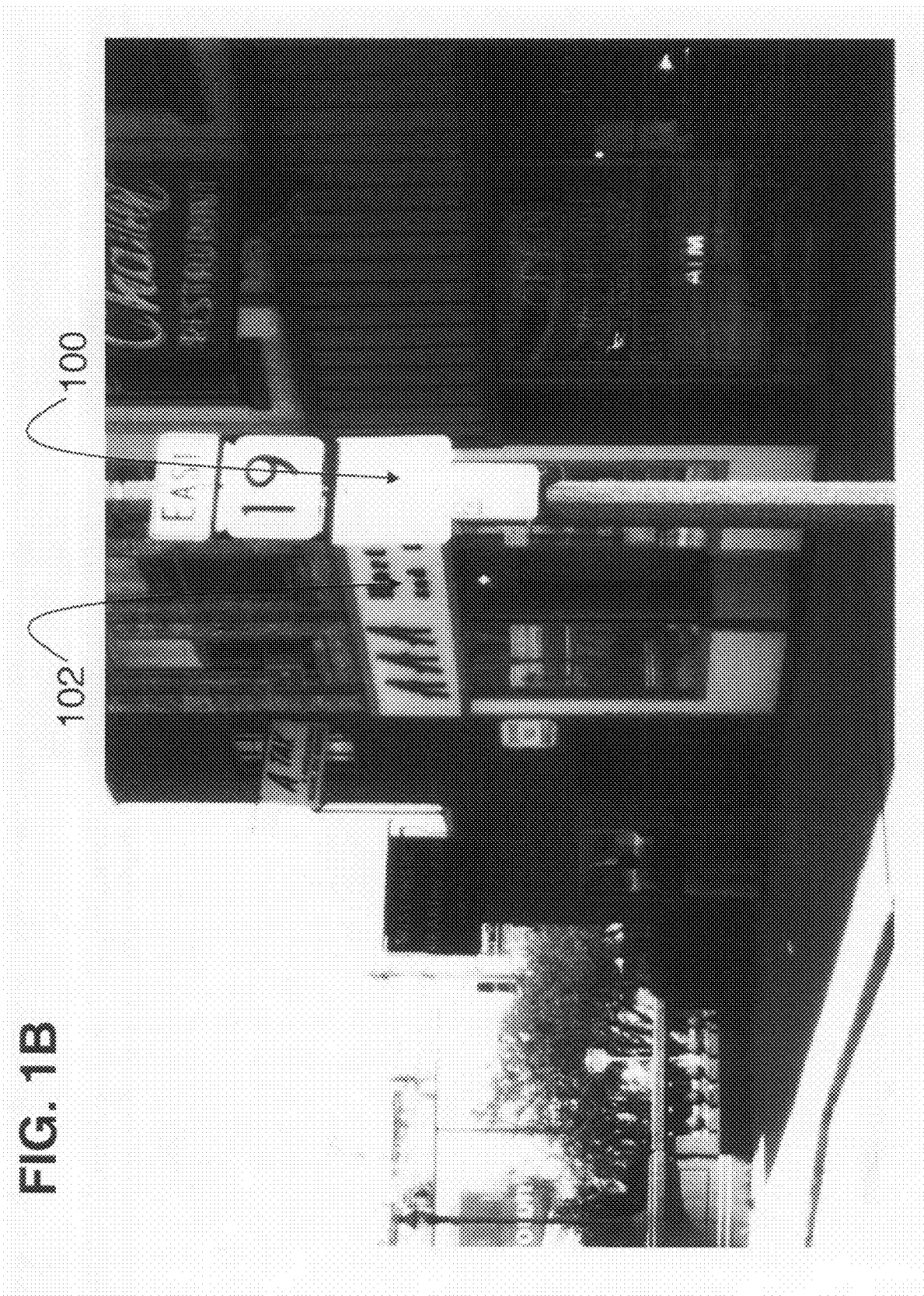
FIG. 1B is a photograph of the same locality as shown FIG. 1A but taken from a different viewpoint where the street sign does not occlude the same portion of the shop sign as occluded in FIG. 1A.
Figure 1C:
FIG. 1C is a photograph showing the same view as in FIG. 1A but post-processed to remove the portion of the street sign that occludes the shop sign and replace the vacant space with the missing portion of the shop sign.

FIGS. 1A through 1C illustrate the utility of some embodiments of the present invention. FIG. 1A is a photograph of street scene with buildings adjoining the street. In the view of FIG. 1A, a street sign 100 partially blocks the view of a sign 102 on one of the shops next to the street. An image dataset can incorporate the photograph of FIG. 1A. Different image datasets serve different purposes, and for some of those purposes, it is preferable that the shop sign 102 be clearly readable.

FIG. 1B is another photograph, taken from a slightly different point of view from that of FIG. 1A. Comparing FIGS. 1A and 1B, the foreground street sign 100 has "moved" relative to the background shop sign 102. Because of this parallax "movement," the portion of the shop sign 102 that is blocked in FIG. 1A is now clearly visible in FIG. 1B. (Also, a portion of the shop sign 102 that is visible in FIG. 1A is blocked in FIG. 1B.)

FIGS. 1A and 1B together have enough information to show the entire shop sign 102. Using techniques discussed below, the information from these two figures is processed to effectively "remove" the blocking portion of the street sign 100 and thus to allow the entire shop sign 102 to be seen. The result is FIG. 1C. Here, the viewpoint is the same as in FIG. 1A, but the processed image of FIG. 1C shows the entire shop sign 102. When the resulting image dataset is viewed, the processed image of FIG. 1C effectively replaces the image of FIG. 1A, thus rendering the shop sign 102 completely visible.

In the example of FIG. 1C, only the portion of the street sign 100 that blocks the shop sign 102 is removed: Most of the street sign 100 is left in place. This is meant to clearly illustrate the removal of the blocking portion of the street sign 100. In some embodiments, it is expected that the entire street sign 100 would be effectively removed. Also, other visible objects could be removed. For example, the person shown in the figures could be effectively removed from the scene using the techniques discussed below. In some embodiments, the blocking portion of the street sign 100 is left in place but is visually "de-emphasized" (e.g., rendered semi-transparent) so that the shop sign 102 is revealed behind it.

FIGS. 2A and 2B illustrate an exemplary system for populating an image dataset. (For example, this system can be used to capture the images of FIGS. 1A and 1B.) The system in these figures collects images of a locality in the real world. In FIG. 2A, a vehicle 200 is driving down a road 202. The vehicle 200 includes an image-capture system 204. The image-capture system 204 may include multiple cameras taking overlapping still images or video of both sides of the road 202. The images or video are in a suitable format, such as *.jpg, *.mpg, *.avi, *.bmp, *.mov, etc. The vehicle 200 also includes a system for determining its present location, such as a GPS receiver. As the vehicle 200 proceeds down the road 202, the captured images are stored and are associated with the geographical location at which each picture was taken.

In some implementations, the image-capture system 204 includes a range-finding device, such as LIDAR. The image-capture system 204 and the range-finding device are "registered" so that the distance from the image-capture system 204 to whatever it is viewing is detected and recorded. With such a system, a portion of a captured image (such as every pixel or a group of pixels) is associated with the distance from the image-capture system 204 to the object in the portion of the image. When a range-finding device is combined with the vehicle's location-determination system (e.g., QPS), the precise real-world geographic location of every pixel is known. When stored with this location information, the resulting pixels are called "3D pixels."

206 shows the point-of-view of just one camera in the image-capture system 204. As the vehicle 200 passes the building 208, this camera (and others, not shown) image various areas of the building 208. Located in front of the building 208 are "occluding objects," here represented by signposts 210. These are called "occluding objects" because they hide (or "occlude") whatever is behind them. In the example of FIG. 2A, from the illustrated point-of-view 206, the doorway 212 of the building 208 is partially occluded by one of the signposts 210. In many applications, the front of the building 208 is of interest so it is desired to remove or de-emphasize these signposts 210.

As the vehicle 200 proceeds down the road 202, areas of the building 208 originally imaged by one camera are now imaged again by other cameras (or the same camera from another vantage point). For example, the doorway 212 was imaged by a forward looking camera with the point-of-view 206 in FIG. 2A; in FIG. 2B, the same doorway 212 is imaged by a side-view camera with the point-of-view 214. (In many embodiments, each camera in the image-capture system 204 maintains a fixed orientation with respect to the vehicle 200. In other embodiments, the cameras pan as the vehicle 200 moves.) For the present discussion, the important point to make with respect to FIG. 2B is that in this point-of-view 214, the doorway 212 is not occluded by any of the signposts 210. As discussed in greater detail below, this fact can be used to reveal the occluded objects, such as the doorway 212, in the image dataset that stores the images captured by the system shown in FIGS. 2A and 2B.

Figure 3:
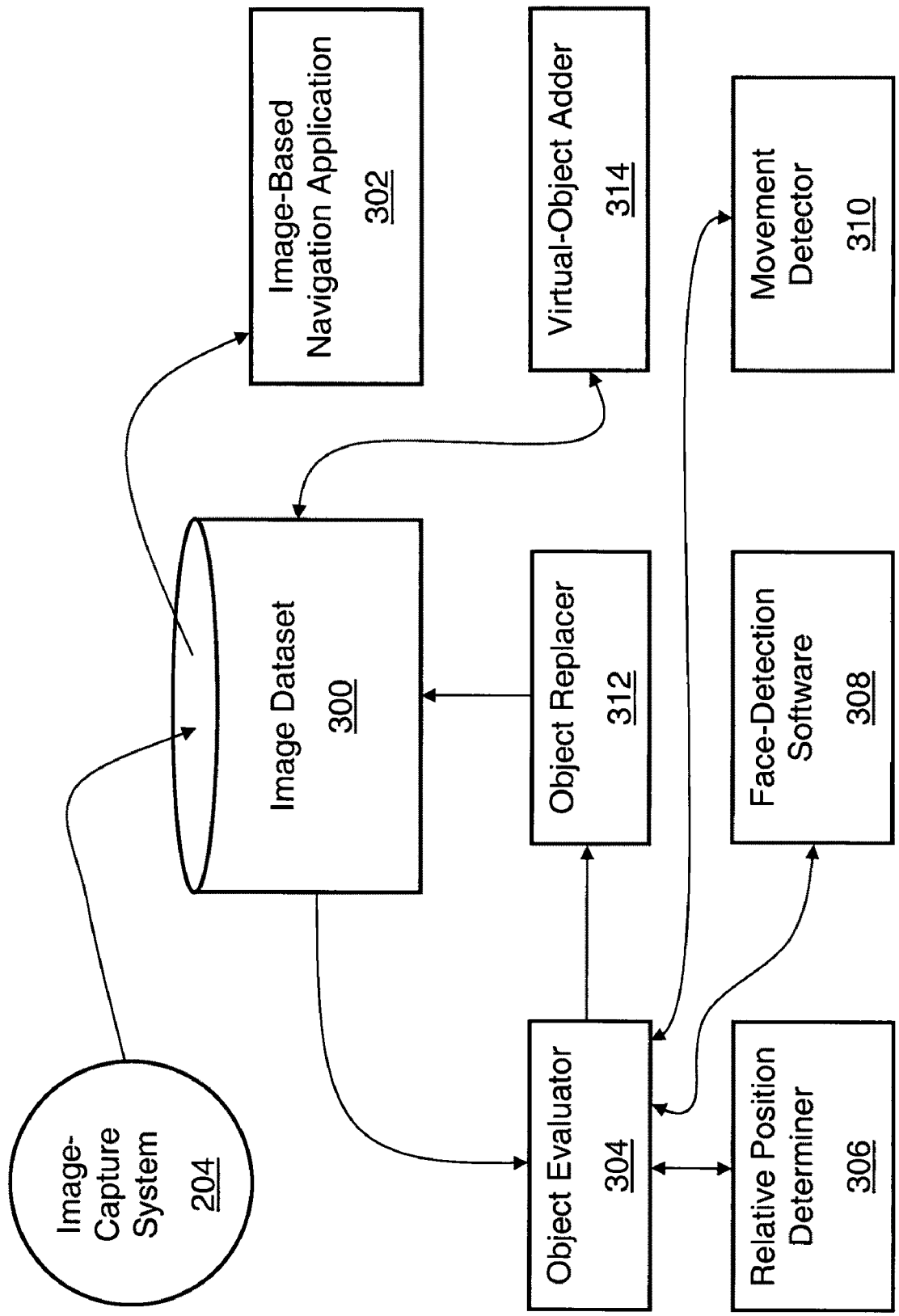
FIG. 3 is a schematic of an exemplary system for collecting images into an image dataset and for post-processing the image dataset.

An exemplary system for storing and using captured images is presented in FIG. 3. An exemplary method for using this system is illustrated in FIG. 4. The image-capture system 204 delivers its images to an image dataset 300. The image dataset 300 is stored on any of a number of computer-readable media. For example, it may be stored on one or more hard drives at one or more locations. During use and processing, portions of the image dataset 300 can be loaded into a computer's RAM or ROM. When the image dataset 300 is transformed or processed in some way, the resulting product is stored on the same computer-readable medium or on another one. The transformed image dataset 300, in whole or in part, may be distributed to users on a tangible medium, such as a CD, or may be transmitted over a network such as the Internet or over a wireless link to a user's mobile navigation system.

Many different applications can use this same image dataset 300. As one example, an image-based navigation application 302 allows a user to virtually walk down the street 202. No matter where the user moves or in what direction he turns his head, this navigation application 302 presents on the user's computer screen a photographic image from the real-world locality that corresponds to the user's virtual position and viewpoint. The captured images are "stitched" together using techniques, such as those disclosed in U.S. Pat. No. 7.688,229, to present seamless, 360-degree views (or even 360-degrees around plus up and down).

To enhance the experience presented by the image-based navigation application 302 and by other applications, the system in FIG. 3 includes another component here called an "object evaluator" 304. The evaluator 304 reviews the visual objects represented by data in the image dataset 300 and determines which, if any, of these objects should be removed or otherwise de-emphasized. (Step 402 of FIG. 4.)

Various embodiments use one or more techniques to decide if a visual object should be removed or de-emphasized. The object evaluator 304 can call the "relative position determiner" 306 to see if one object lies in front of, and partially occludes, another object. (Step 400 of FIG. 4.) If so, then the object in front may need to be removed or de-emphasized. This is the situation with the signpost 210 of FIG. 2A. Embodiments of the relative position determiner 306 can apply various techniques in parallel. First, when the image-capture system 204 includes a range finder and the pixels are 3D, the position information can be examined to see which objects were closer to the camera and thus in front of objects in the background. (In some embodiments, some, but not all, of the visual objects in the image dataset 300 include direct position information. That is, only some of the pixels are 3D. In that case, the position of visual objects can often be inferred from cross-correlating the known positions of surrounding objects.) Second, when multiple images capture a similar area, the images are compared, and foreground objects will "move" by parallax with respect to the background objects.

Another object identification technique specifically finds objects that represent people. When the image dataset 300 represents a real-world locality, its captured images may include views of pedestrians. For privacy concerns, it may be desired to remove or to blur views of pedestrians. Pedestrians may be recognized by the relative position determiner 306 or could be recognized by specific face-detection software 308.

Yet another identification technique is represented by the "movement detector" component 310. This component 310 reviews multiple images to see if an object, e.g., a vehicle, physically moved in the time interval between when one image was captured and when the next image was captured. For some applications that use the image dataset 300, moving objects are not of interest and may be removed. (Note that this translational movement is different from the apparent, parallax movement discussed above. Nevertheless, there may well be overlap in the software between these two types of motion detectors.)

Some embodiments strictly separate the act of choosing an object from the act of actually removing or de-emphasizing the chosen object. Because of this separation, the removal/de-emphasis techniques described below can be used with many different techniques for deciding which visual objects to remove or de-emphasize. These techniques base their decisions on particular situations and criteria. For example, a witness tells authorities that a blue car was used in a crime. The identification techniques described above are modified, and all non-blue cars are removed from the scene. Once the extraneous cars are removed, the modified scene may help the witness to further identify the desired vehicle. Another technique chooses to remove all occluding objects within a given distance of a chosen occluded object. In a third example, all occluding objects are removed along a given street from one selected street address to another. As other situations arise, other removal criteria are developed and fed into the removal/de-emphasis techniques.

Once a visual object has been chosen for removal or de-emphasis, the data representing that visual object may be simply removed by the object replacer 312 from the image dataset 300. (Step 404 of FIG. 4.) However, different applications have different requirements for what should, and what should not, be removed. Thus, some embodiments leave the data in place but "effectively delete" a chosen object by flagging its data in some way so that some applications can act as if the chosen object did not exist; other applications can choose to display the flagged object. In another embodiment, objects chosen for deletion are left in place but are visually de-emphasized. Here, a user still sees the image of the occluding object, but at the same time sees through it to the occluded object. For example, FIG. 1C could be modified so that the street sign 100 is still visible, but it is semi-transparent or shown only in outline so that the shop sign 102 can be read. In yet another embodiment, data representing removed objects are stored in a repository for possible later use by the virtual-object adder 314 (discussed below).

In some circumstances, the work of the object replacer 312 is not completed once a chosen visual object is effectively removed or de-emphasized. Turning back to FIG. 2A, the data representing the signposts 210 are deleted, but that leaves a visual "hole" in the doorway 212 as seen from the point-of-view 206. Several techniques can be applied to fill this visual hole. In FIG. 2B, the point-of-view 214 includes the entire doorway 212 with no occlusion. The pixels taken in FIG. 2B can be used to fill in the visual hole. Because the angles of the points-of-view 206 (FIG. 2A) and 214 (FIG. 2B) are different, the pixels from the point-of-view 214 are first interpolated or transformed, using known techniques (such as an affine transformation) before putting them into the image for the point-of view 206. (Step 406 of FIG. 4.) The resulting image dataset 300 is now usable to portray the locality of FIGS. 2A and 2B as if the signposts 210 did not exist or were semi-transparent.

In some situations, the object replacer 312 is able to choose among several candidate images in order to get the pixels needed to fill the hole created when a visual object is removed or de-emphasized. When the image dataset 300 includes images from multiple drive-bys of the same scene, the object replacer 312 applies any number of criteria to choose which images to work from. For example, the lighting may be better in one drive-by than in another. Also, a deciduous tree in winter occludes less of the background than does the same tree in summer. Having chosen an appropriate image (or an appropriate combination of images, if necessary), the object replacer 312 applies the techniques discussed above to fill in the visual hole.

In some scenes (e.g., a street with lots of occluding objects), the image dataset 300 may not have enough information to completely fill in the visual holes left when occluding objects are effectively removed or de-emphasized. It may be possible to guess what visual information should be supplied and then to proceed on that basis. For example, there is a brick wall on one side of the street, and that wall is mostly uniform wherever it can be seen. Thus, the visual texture of the brick wall can be interpolated even to locations that are always occluded. A hybrid approach is also sometimes useful, where non-occluded images are used to fill in as much of the visual holes as possible and with interpolation used for the remainder.

A further use of the image dataset 300 is contemplated. Having removed chosen objects, a "virtual-world locality" can be created by adding virtual visual objects to the image dataset 300. (Virtual-Object Adder component 314 of FIG. 3.) For example, a virtual landscaping application can add objects such as flower planters and trees to the street scene to assess their aesthetic appeal. (Step 408 of FIG. 4.) Signs, bus stops, and other functional elements can be added, and their utility tested. (E.g., is a street sign visible from a sufficient distance and through a sufficient angle of view?) Visual objects can be added and deleted until the resulting image dataset 300 depicts a virtual-world locality rather than any real-world locality. In some embodiments, the virtual-object adder 314 draws visual objects from its own data repository. This repository can include, among other things, data representing visual objects that were removed from the image dataset 300. Thus, a visual object representing an actual tree is removed from one view because it occludes the background. Then, a virtual landscaping application uses the same data to add a virtual tree to another view.

Figure 5:
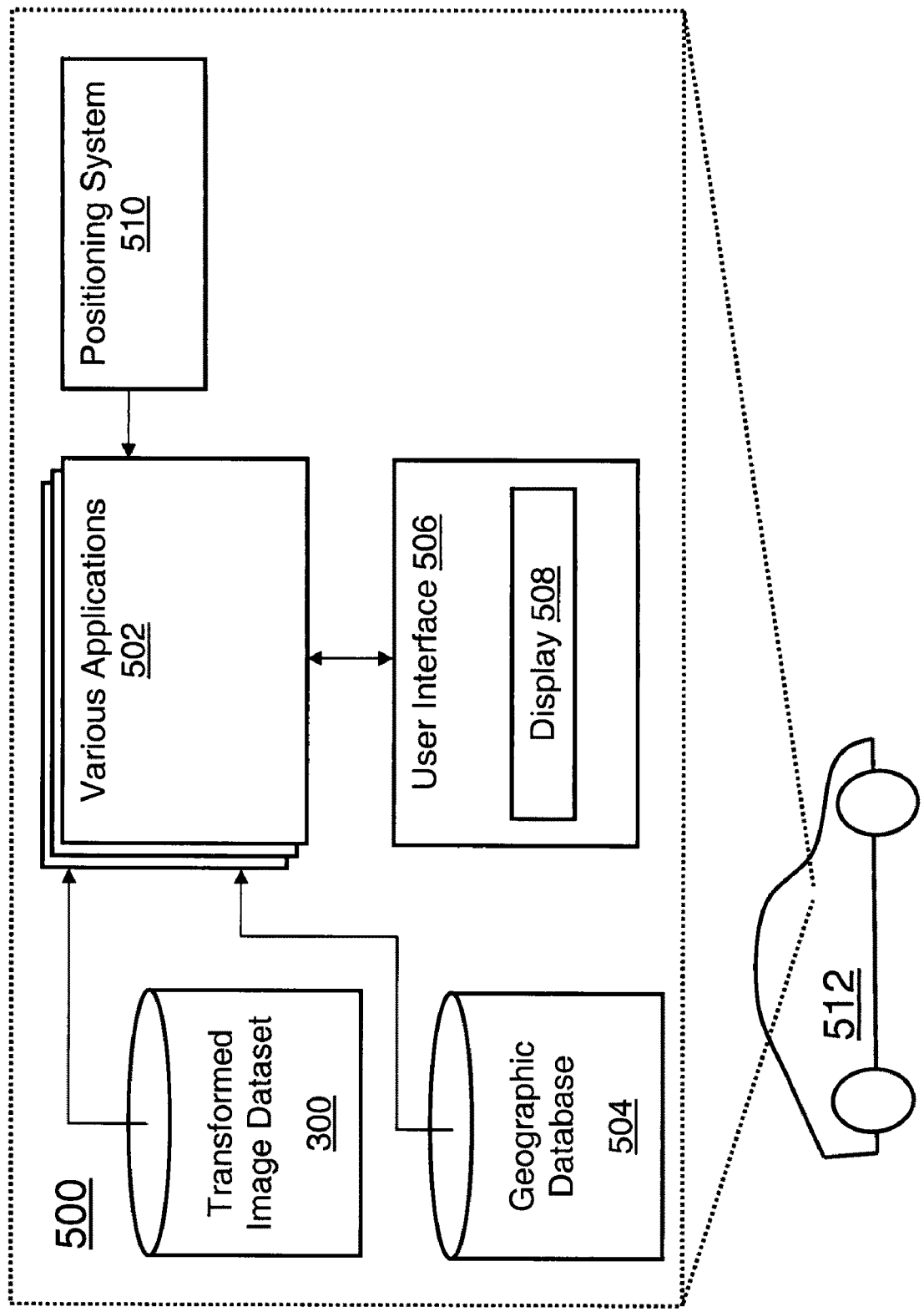
FIG. 5 is a schematic of an exemplary end-user computing platform that accesses the transformed image dataset.

The transformed image dataset 300 can be accessed from a device such as the exemplary computing platform 500 shown in FIG. 5. This platform 500 runs one or more applications 502 including, for example, the image-based navigation application 302 as discussed above. For this application 302, the user navigates using tools provided by an interface 506 (such as a keyboard, mouse, microphone, voice recognition software, and the like). In response, the application 302 reads information from the transformed image dataset 300 and displays it on the display 508 of the user's interface 506.

Some embodiments of the computing platform 500 include access to a geographic information database 504. Using this database 504, the platform 500 can provide navigation-related applications 502 such as route calculation, route guidance, destination selection, electronic yellow pages, vehicle positioning, and map display. Other applications 502 are also possible. This geographic database 504 can include data about the geographic area in which a user's vehicle 512 is located. In some embodiments, the geographic database 504 includes data about the roads in the geographic area, including data indicating the locations of the roads and intersections. The geographic database 504 may also include information about the names of the roads, one-way streets, number of lanes, locations of traffic signals and signs, speed limits, turn restrictions, address ranges, and so on. The geographic database 504 may also include information about points of interest, such as businesses, landmarks, museums, ATMs, government offices, and so on. In some embodiments, the data in the geographic database 504 are in a format that is optimized for providing navigation-related functions.

In some embodiments, applications 502 have access to information from a positioning system 510, such as a GPS device. The positioning system 510 may include inertial sensors, differential wheel-speed sensors, a compass, or other equipment that enables the position of the user's vehicle 512 to be determined. The position may be determined as geographic coordinates (latitude, longitude, and altitude), street address, or in any other way.

In some embodiments, the computing platform 500 is a combination of hardware, software, and data installed in a vehicle 512 as an in-vehicle navigation system. The platform 500 can also be installed on a special-purpose, handheld navigation device, on a personal digital assistant, on a personal computer, or on a mobile telephone supporting a navigation application. The computing platform 500 may be a standalone platform in which the hardware, software, and data are all located locally, e.g., within the vehicle 512. Alternatively, the computing platform 500 may be connected to a network, e.g., the Internet or a wireless network. In some embodiments, the transformed image dataset 300 and the geographic database 504 are located remotely from the computing platform 500 and are accessed via the network. In some embodiments, the dataset 300 and database 504 are local to the computing platform 500, but updates are received over the network. Some applications 502 can also be provided, in whole or in part, over the network.

In view of the many possible embodiments to which the principles of this invention may be applied, it should be recognized that the embodiments described herein with respect to the drawing figures are meant to be illustrative only and should not be taken as limiting the scope of the invention. For example, embodiments in some environments may take advantage of other image-capture systems or may support end-user applications other than those illustrated. Therefore, the invention as described herein contemplates all such embodiments as may come within the scope of the following claims and equivalents thereof.

We claim:

1. A method for transforming an image dataset, the image dataset captured by a camera on a vehicle driving along a road, and the image dataset comprising data representing a first object and a second object, the first object at least partially occluding the second object from at least one point of view, the method comprising:
   reading the image dataset from a first computer-readable medium;
   determining relative positions of the first and second objects;
   based, at least in part, on the relative positions of the first and second objects, transforming the image dataset to reveal a portion of the second object occluded by a portion of the first object from the at least one point of view, wherein the portion of the first object occluding the portion of the second object is deemphasized by being semi-transparent to reveal the portion of the second object previously occluded by the portion of the first object from the at least one point of view; and
   storing the transformed image dataset on a second computer-readable medium.

2. The method of claim 1 wherein the first and second computer-readable media are the same medium.

3. The method of claim 1 wherein the image dataset comprises multiple images taken from multiple points of view, at least some of which images overlap.

4. The method of claim 1 wherein the image dataset represents a locality selected from the group consisting of: a real-world locality and a virtual-world locality.

5. The method of claim 1 wherein the image dataset comprises 3D pixels.

6. The method of claim 5 wherein determining relative positions of the first and second objects comprises comparing position information of sets of 3D pixels that represent the first and second objects.

7. The method of claim 1 wherein the first object represents an item selected from the group consisting of: a person, a vehicle, a structure, a sign, and a plant.

8. The method of claim 1 wherein determining relative positions of the first and second objects comprises:
   comparing a plurality of images in the image dataset; and
   based, at least in part, on the comparing, finding a parallax movement of the first object with respect to the second object.

9. The method of claim 1 wherein transforming the image dataset is further based, at least in part, on detecting a face in the first object.

10. The method of claim 1 wherein transforming the image dataset is further based, at least in part, on:
    comparing a plurality of images in the image dataset; and
    based, at least in part, on the comparing, finding a translational movement of the first object with respect to the second object.

11. The method of claim 1 wherein transforming the image dataset comprises interpolating 3D pixels in the second object.

12. The method of claim 11 wherein interpolating 3D pixels in the second object comprises:
    comparing 3D pixels from a plurality of images in the image dataset; and
    replacing 3D pixels occluded by the first object in a first image with 3D pixels corresponding to a same location in a second image and not occluded by the first object.

13. The method of claim 12 further comprising applying an affine transformation to at least some of the 3D pixels in the second image not occluded by the first object.

14. The method of claim 1 wherein transforming the image dataset comprises interpolating a texture of an object adjacent to the second object.

15. The method of claim 1 further comprising transforming the image dataset by adding data representing a third object.

16. A non-transitory computer-readable medium containing computer-executable instructions for a method for transforming an image dataset, the image dataset comprising data representing a first object and a second object, the first object at least partially occluding the second object from at least one point of view, the method comprising:
   reading the image dataset from a first computer-readable medium;
   determining relative positions of the first and second objects;
   based, at least in part, on the relative positions of the first and second objects, transforming the image dataset to reveal a portion of the second object occluded by a portion of the first object from the at least one point of view, wherein the portion of the first object occluding the portion of the second object is deemphasized by being semi-transparent to reveal the portion of the second object previously occluded by the portion of the first object from the at least one point of view; and
   storing the transformed image dataset on a second computer-readable medium.

17. A system for transforming an image dataset, the system comprising:
   a camera system for gathering multiple images representing a real-world locality, the images taken from multiple points of view, at least some of which images overlap, wherein the camera system includes a LIDAR device to gather position information;
   a first computer-readable medium for containing an image dataset, the image dataset comprising images gathered by the camera system;
   a program for determining 3D positions of pixels in the image dataset using data gathered via the LIDAR device;
   a program for determining relative positions of objects represented by data in the image dataset based on the determined 3D positions of the pixels;
   a program for determining whether a first object in the image dataset at least partially occludes a second object from at least one point of view;
   a program for transforming the image dataset to reveal an occluded portion of the second object from the at least one point of view, wherein a portion of the first object occluding the portion of the second object is deemphasized by being semi-transparent to reveal the portion of the second object previously occluded by the portion of the first object from the at least one point of view; and
   a second computer-readable medium for containing the transformed image dataset.

18. The system of claim 17 wherein the first and second computer-readable media are the same medium.

19. The system of claim 17 further comprising a program for transforming the image dataset by adding data representing an object.

20. A method for accessing a transformed image dataset, the transformed image dataset based on image data captured by a camera on a vehicle driving along a road, and the transformed image dataset derived, at least in part, from an initial image dataset, wherein deriving comprises flagging a portion of an object of the image dataset that at least partially occludes another object, the method comprising:
   reading from a computer-readable medium data representing images in the transformed image dataset;
   receiving navigation information;
   based, at least in part, on the received navigation information, determining a point of view; and
   presenting images from the transformed image dataset based on the point of view, wherein a portion of the other object occluded by the flagged object portion is revealed in a first display application from the point of view, wherein the portion of the other object occluded by the flagged object portion is not revealed in a second display application from the point of view, and wherein the decision to reveal the portion of the occluded object in the first display application is based on the flagging.

21. The method of claim 20 wherein the method comprises an application selected from the group consisting of: an image-based navigation application, a route calculator, a route guidance application, a destination selector, electronic yellow pages, a vehicle-positioning application, and a map display application.

22. The method of claim 20 wherein the image dataset represents a locality selected from the group consisting of: a real-world locality and a virtual-world locality.

23. The method of claim 20 wherein reading from a computer-readable medium comprises reading over a network.

24. The method of claim 20 further comprising receiving updates to the transformed image dataset.

25. A non-transitory computer-readable medium containing computer-executable instructions for performing a method for accessing a transformed image dataset, the transformed image dataset derived, at least in part, from an initial image dataset, wherein deriving comprises flagging a portion of an object of the image dataset that at least partially occludes another object, the method comprising:
   reading from a computer-readable medium data representing images in the transformed image dataset;
   receiving navigation information;
   based, at least in part, on the received navigation information, determining a point of view; and
   presenting images from the transformed image dataset based on the point of view, wherein a portion of the other object occluded by the flagged object portion is revealed in a first display application from the point of view, wherein the portion of the other object occluded by the flagged object portion is not revealed in a second display application from the point of view, and wherein the decision to reveal the portion of the occluded object in the first display application is based on the flagging.

* * * * *